MULTIPLE SPEED PHONOGRAPH TURNTABLE DRIVE

Filed June 10, 1950 6 Sheets-Sheet 1

INVENTOR.
JAMES D. COLE
BY
J. D. Douglas
His Atty

MULTIPLE SPEED PHONOGRAPH TURNTABLE DRIVE

Filed June 10, 1950 6 Sheets-Sheet 2

INVENTOR.
JAMES D. COLE
BY
J. D. Douglass
His atty

MULTIPLE SPEED PHONOGRAPH TURNTABLE DRIVE

Filed June 10, 1950 6 Sheets-Sheet 3

INVENTOR.
JAMES D. COLE
BY
J. D. Douglas
His atty

INVENTOR.
JAMES D. COLE
BY
J. D. Douglas
His Atty

Aug. 12, 1952 J. D. COLE 2,606,451

MULTIPLE SPEED PHONOGRAPH TURNTABLE DRIVE

Filed June 10, 1950 6 Sheets-Sheet 5

INVENTOR.
JAMES D. COLE

BY J. D. Douglas
His atty

Aug. 12, 1952 J. D. COLE 2,606,451

MULTIPLE SPEED PHONOGRAPH TURNTABLE DRIVE

Filed June 10, 1950 6 Sheets-Sheet 6

INVENTOR.
JAMES D. COLE

BY

J. D. Douglas
His atty

Patented Aug. 12, 1952 2,606,451

UNITED STATES PATENT OFFICE 2,606,451

MULTIPLE-SPEED PHONOGRAPH TURNTABLE DRIVE

James D. Cole, Park Ridge, Ill.

Application June 10, 1950, Serial No. 167,299

21 Claims. (Cl. 74—199)

This invention pertains to phonograph motors, and more particularly to a motor capable of driving a phonograph turntable at a plurality of speeds.

In the past, nearly all phonograph records for use in the home have been produced for playing at a single speed (78 R. P. M.). However, with the advent of records to be played at 33⅓ R. P. M. and 45 R. P. M., it is necessary, in order to use these records, to have separate drives for each speed. This may be accomplished by several means. For instance, it would be possible to provide a motor which would turn at different speeds. However, this type motor is very expensive. A system of gears might also be possible, but gears are generally too noisy for use in a phonograph. I have, however, invented a new friction type speed changing drive and mechanism particularly adapted for use in a phonograph.

My invention comprises means driven by the motor shaft adapted to be brought into frictional driving engagement with a rubber tired wheel which, in turn, drives the turntable by frictional engagement therewith. The means driven by the motor includes driving surfaces of a plurality of diameters which may be brought into engagement with the rubber tired wheel either by shifting the driving means or, upon occasion, by shifting the driving wheel. The shifting causes the wheel to engage a larger or smaller diameter driving means to change the speed of its rotation and, therefore, of the turntable disc on which the records rest.

The details of my invention, and the invention itself will be made more clear by referring to the following description and the drawings which form a part of this specification.

Figures 1, 2, 5:
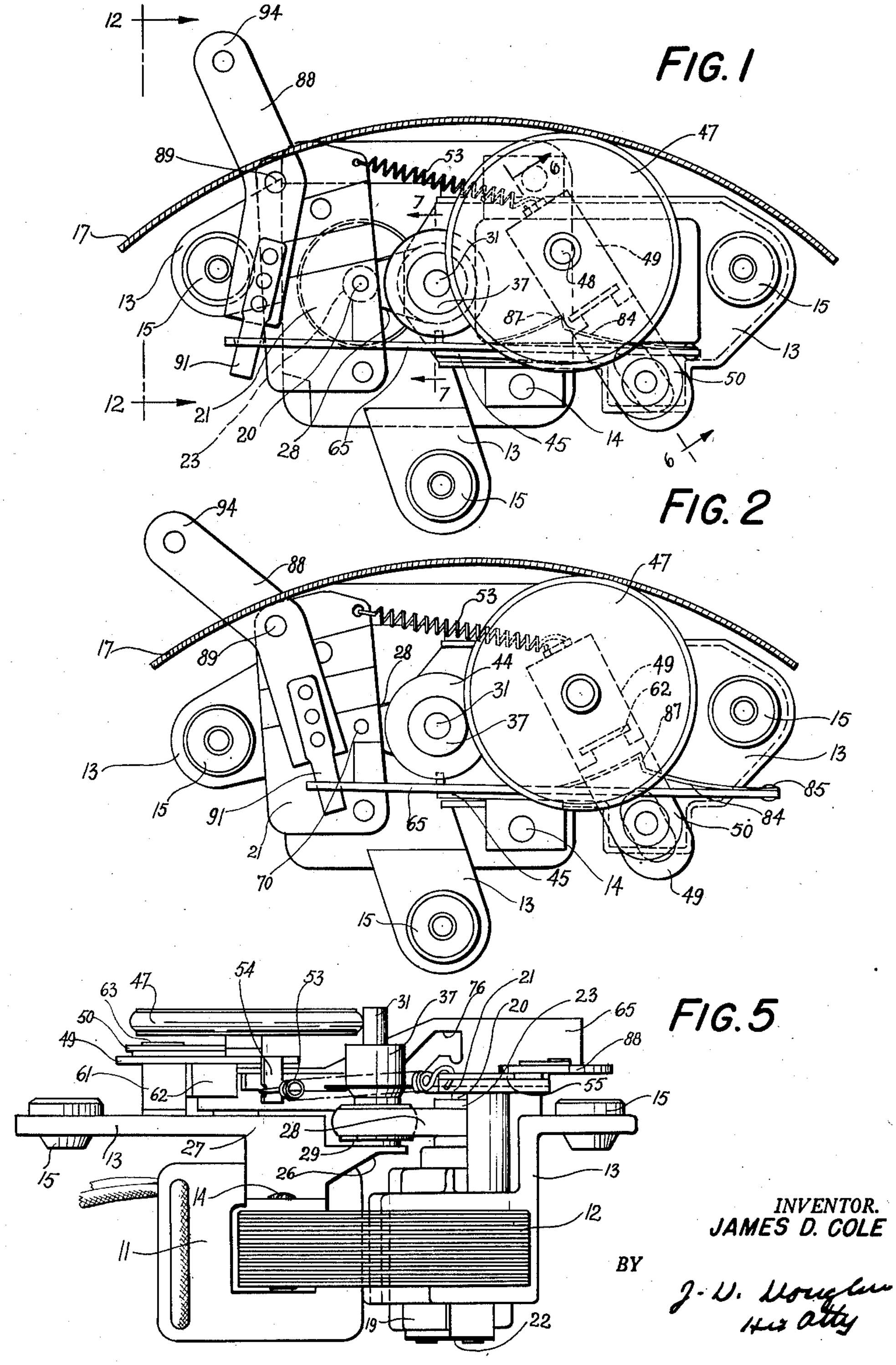
Fig. 1 is a top view of my invention from just below the surface of the turntable showing an embodiment adapted for two speeds.
Fig. 2 is a view similar to Fig. 1 showing the parts in the alternate position from Fig. 1.
Fig. 5 is a side elevational view of the motor drive removed from its surroundings from the opposite side from Fig. 3.

Briefly, my invention comprises a drive mechanism for the turntable of a record player. It includes a motor of the usual shaded pole induction type driving an idler pulley through a shiftable means by frictional engagement, the shiftable means being adapted to shift from one speed to another by changing the means driving the idler. The shiftable means comprises a larger pulley shiftable to cover or expose a smaller pulley. The idler will be turned at different speeds then, depending on which of the two pulleys is in the plane to be engaged by the idler. These pulleys are preferably on a separate shaft and driven by a belt drive from the motor.

More specifically, and with reference to the drawings, my device includes a motor which may be similar to that described in my copending application, Ser. No. 80,549, filed March 9, 1949, now abandoned. This motor comprises a stator including a winding 11 and pole pieces 12. Support legs which may be cast integral with the pole pieces 12 or fixed thereto by rivets 14 extending upwardly from the pole piece and then at right angles thereto to provide for mounting the motor. Rubber grommets 15 inserted into holes in these legs provide a vibration and noise insulator between the motor and the base plate 16 of the record changer in which my drive may be used. The base plate 16 is formed in somewhat dished shape so that the turntable 17, which is supported thereon by any customary means, may be set down in the hollow somewhat. The rotor 19 of the motor is journalled on a shaft 20 which is supported on the motor by an upper bracket 21 and lower bracket 22. A pulley 23 is pressed into the rotor 19 and turned thereby. The construction of the motor is more completely described in my aforesaid copending application.

Figures 7, 8, 9:
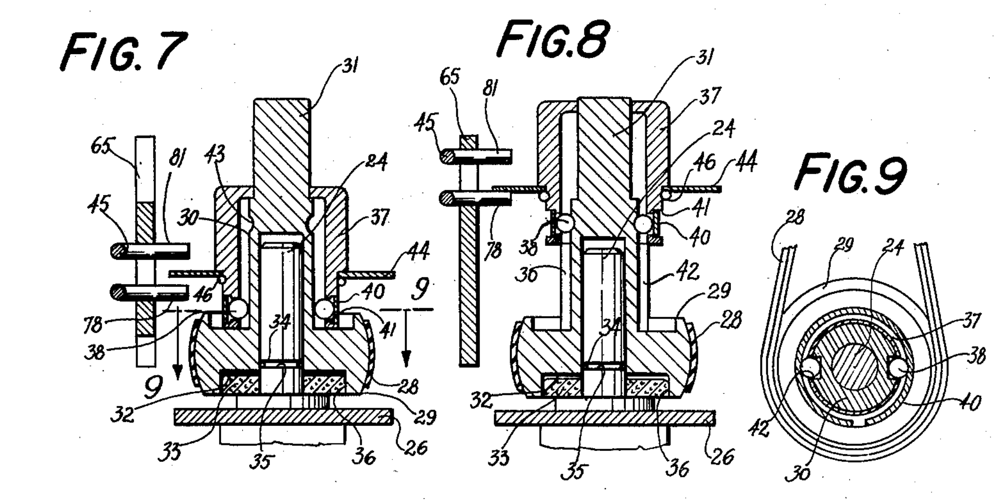
Fig. 7 is a detailed sectional view to an enlarged scale along line 7—7 of Fig. 1.
Fig. 8 is a view similar to Fig. 7 showing the pulley in the high speed position.
Fig. 9 is a detailed sectional view along line 9—9 of Fig. 7.

In order to accomplish my drive, I provide an idler shaft 24 (Figs. 7 and 8) on which is journalled the shiftable means. This shaft is supported on an offset step part 26 of the support bracket 27 which also carries one of the support legs 13 (Fig. 5).

The drive from the pulley 23 on the motor to the turntable is through a wide belt 28 to a pulley 29 on the shiftable means. This pulley has a long hub 30 (Figs. 7 and 8) extending upward and terminating in a small driving rotor 31. The pulley 29 may be conveniently held on the shaft 24 by a star washer 32 resting on a felt washer 33 which serves as a thrust bearing. The star washer 32 is kept from upward movement by a ring 34 engaged in a groove 35 in the shaft. The pulley 29 is held in place by the engagement of the arms or points of the star washer with an internal counter bore 36 on the pulley.

Surrounding the hub 30 and slidably journalled thereon is a larger driving rotor 37 which is adapted to be shifted vertically on the hub 30. The larger rotor 37 is driven by the hub 30 through a pair of balls 38 disposed in drilled holes in the lower part of the rotor, and which are held therein by a spring steel ring 40 disposed in a groove 41 around the hub. These balls 38 are engaged in longitudinal keyways 42 in the hub 30 of the pulley so that they can roll longitudinally of the hub but serve as keys to drive the larger rotor 37 rotatively. A pair of dimples 43 at the upper ends of the keyways 42 serve as detents in which the balls are engaged when the rotor 37 is shifted to its upper position. A fiber plate 44 fixed on the lower part of the larger rotor 37 provides an edge which may be engaged by the shifting fork 45 as hereinafter described. This plate is held in place by a spring wire clip 46 engaged in a groove in the rotor 37.

The drive from the rotors to the turntable 17 is accomplished by the usual means including a rubber tired idler wheel 47 supported by a post 48 on a sliding arm 49. The sliding arm 49 is slidably disposed on a support arm 50 which is pivoted by its hub 61 to the same support bracket 27 which supports the idler shaft 24 (Fig. 5). The wheel 47 is urged into engagement with the turntable 17 and the driving rotor 31 by a spring 53 engaged between a depending finger 54 on the sliding arm 49 and the upper bracket 21 which supports the motor shaft and is more fully described hereinafter.

Figures 4, 6:
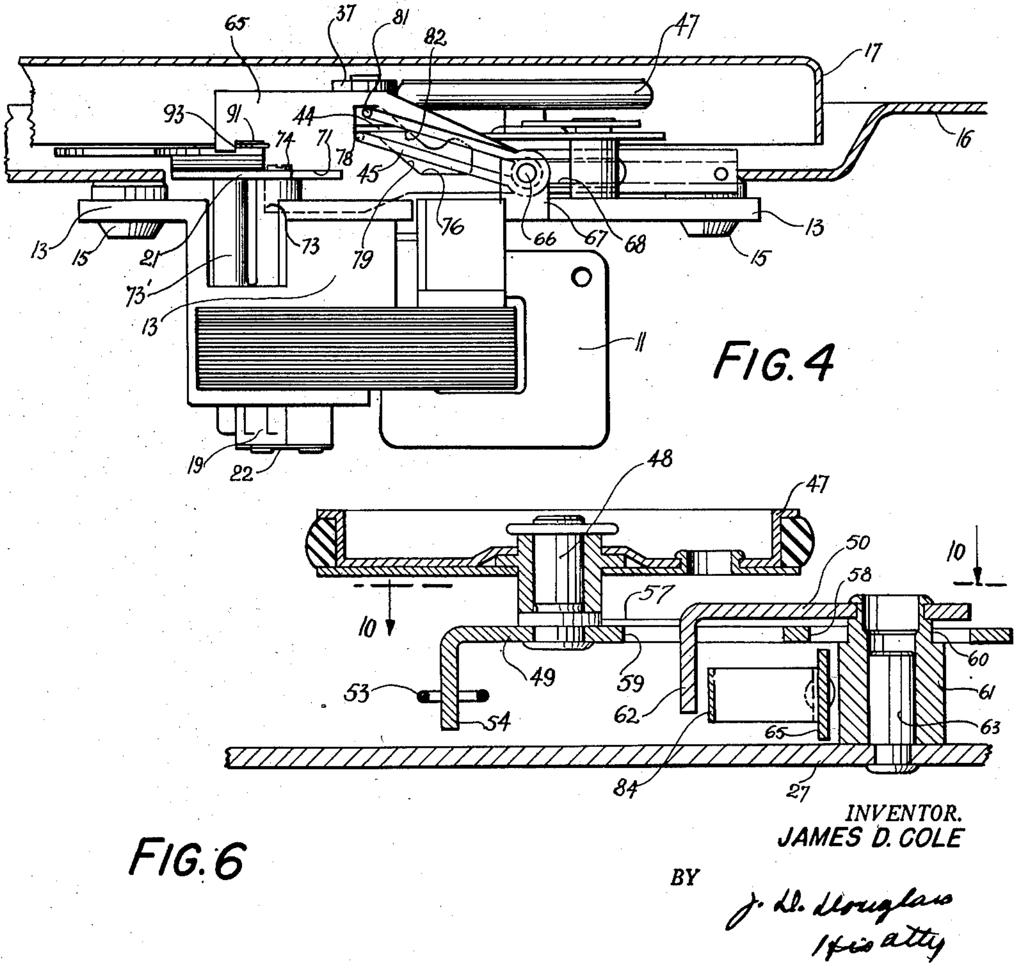
Fig. 4 is a view similar to Fig. 3 with the parts in the same position as Fig. 2.
Fig. 6 is a sectional view to an enlarged scale along line 6—6 of Fig. 1.
Figure 11:
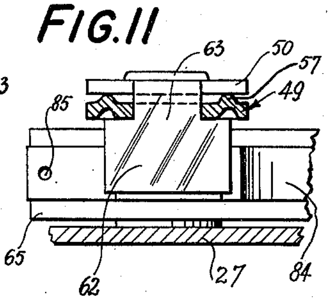
Fig. 11 is a sectional view along line 11—11 of Fig. 10.

The sliding arm 49 is provided with raised ways 57 which engage the support arm 50 on its under side and provide easier sliding. Two slots 58 and 59 are also provided to allow the arm to slide. The first of the slots 58 surrounds a necked-down portion 60 of the hub 61 of the support arm 50 (Fig. 6). The other slot 59 embraces a depending T-shaped flange 62, the cross piece of which serves to support the sliding arm 49 in its proper position (Fig. 11). The hub 61 is fixed to the support arm 50 and provides a bearing for it on the post 63 which is mounted on the support bracket 27, and also serves to locate the wheel 47 properly to engage the rotor 31.

The shifting means for the larger rotor 37 comprises primarily a shifting fork 45 and a sliding cam means 65. The shifting fork comprises a stiff wire bent at its midsection to embrace a pin 66 fixed to an ear 67 on the support bracket 27. The ends of the wire are bent horizontally, forming branches or fingers 78 and 81 extending one on each side of the fiber disc 44 on the larger rotor 37.

Figure 12:
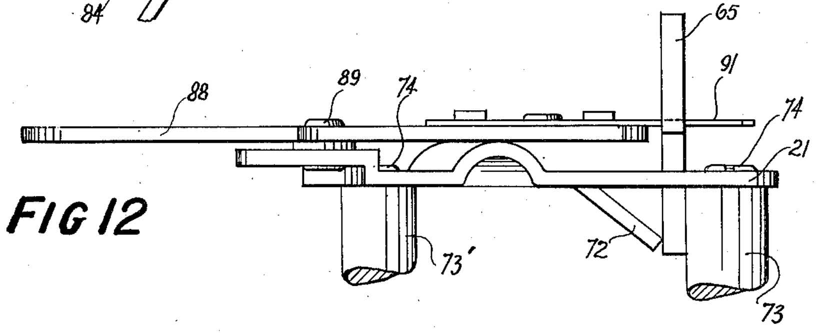
Fig. 12 is a view to an enlarged scale from line 12—12 of Fig. 1.
Figure 13:
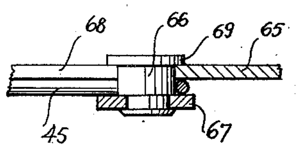
Fig. 13 is a sectional view along line 13—13 of Fig. 3.

The cam plate 65 contains a slot 68 which embraces the pin 66 and is held thereon by the head 69 of the pin 66 (Fig. 13). The other end of the cam plate is supported by a second slot 71 which is slidably disposed about the upper support plate 21. Lateral movement of the cam plate 65 is prevented by a struck down lip 72 (Fig. 12) which, with a post 73 on the motor pole piece 12, provides an opening in which the cam plate may slide. This post 73 along with a similar post 73' support the plate 21 which is fastened thereto by screws 74. Thus, it is apparent that the cam plate 65 may slide in a horizontal direction between limits set by the extent of the slots 68 and 71.

Figure 3:
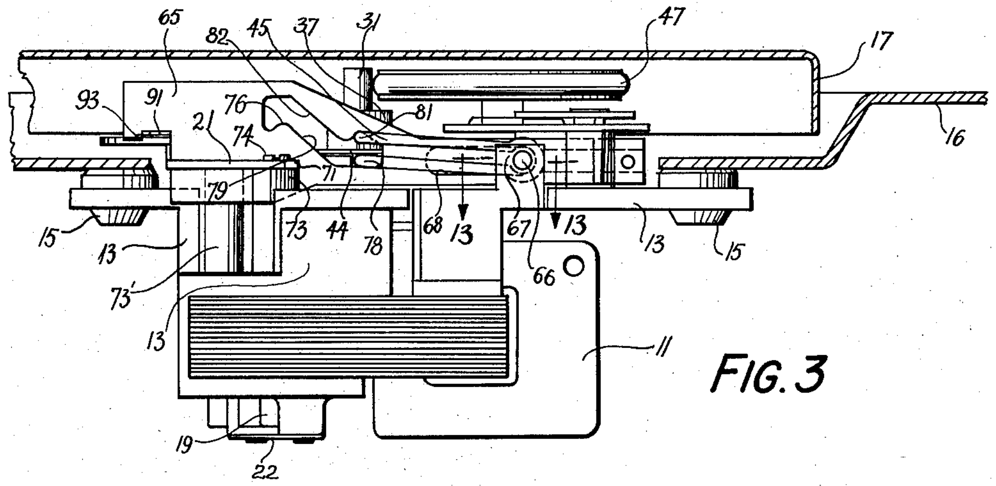
Fig. 3 is a side elevational view of the motor drive showing the turntable and base in section.

In order that this motion may be effective to shift the larger rotor 37 up to the position where it will be engaged by the wheel 47, a cam slot 76 is provided through which the ends of the shifting fork 45 pass to embrace the plate 44. It is apparent that the cam is therefore effective to guide the shifting fork. Thus when the cam plate 65 is moved from the position of Fig. 3 to that of Fig. 4, the lower branch 78 of the fork is guided by the surface 79 in an upward direction carrying the large rotor 37 upward to its top position where the balls 38 engage the detents 43. Then, when the cam moves beyond that, the surface drops away slightly so that the fork is disengaged from the fiber plate and the rotor is completely free to rotate. To lower the rotor 37, the procedure is exactly reversed with the top branch 81 of the fork being guided by the upper surface 82 of the slot 76 and, therefore, moving the rotor downward.

Figure 10:
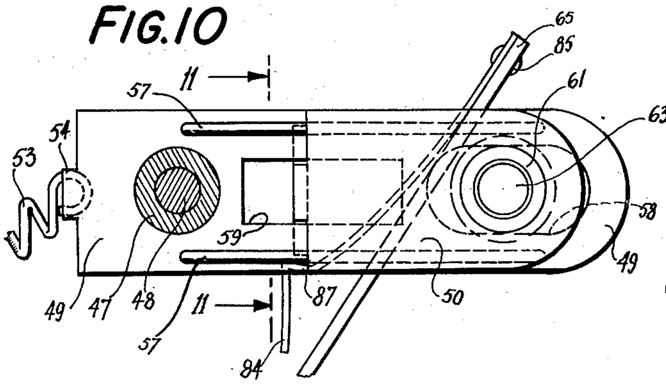
Fig. 10 is a view from line 10—10 of Fig. 6.

A means for moving the idler wheel 47 out of engagement with the small rotor 31 while the larger rotor 37 is shifted into its upper position is provided as best shown in Figs. 1, 2 and 10. A strip 84 of flat spring steel is formed approximately as shown and is fastened to the cam plate 65 by a rivet 85. From the rivet it extends away from the cam 65 in a rising portion ending in a latch formation 87. It is apparent that in moving from the position of Fig. 1 to that of Fig. 2, the strip 84 will be carried to the right by the cam plate 65. As it moves, the latch 87 will engage the cross piece of the flange 62 and carry it to the right, thus disengaging the wheel 47 from the rotor 31. As the cam continues in its movement and raises the larger rotor 37, the flange 62 is carried in an arcuate path away from the cam plate 65 and finally is released from the latch 87. The spring 53 is then effective to pull the wheel 47 back into frictional driven engagement with the larger rotor 37 (Fig. 2) which has been shifted upward by the action of the cam surface 79 on the lower finger 78 of the shifting fork as previously described.

The shifting of the cam plate 65 is accomplished by a lever 88 pivoted on a post 89. A finger 91 formed of hardened steel is riveted to the lever 88 and extends into a rectangular cutout 93 in the cam plate. The other end 94 of the lever is adapted for operation by a linkage in the record player which is not shown because it is no part of this invention. The shifting, then, is done by the finger 91 engaging the edges of the cutout 93 to move the cam plate 65.

A modification of my invention to make it usable as a three-speed drive instead of two is best shown in Figs. 14 to 20. The motor used in this device is similar to that used in the prior described embodiment and similar reference characters are used for the similar parts.

An idler shaft 95 somewhat similar to that of the two-speed embodiment is fixed to the motor pole piece 12 and a bracket 96 which, in turn, may be fixed to the pole piece by screws or rivets 97. A pulley 98 is journalled on this shaft 95 and is driven similarly to that previously described. The hub, however, is stepped, having two different driving diameters separated by a fairly wide chamfered section 100. These diameters are of such size that when the idler wheel 47 engages the smaller diameter 101, the turntable will be driven at a low speed, preferably 33⅓ R. P. M., and when the idler wheel engages the larger diameter 102 the turntable speed will be preferably 45 R. P. M. A rotor 103 is slidably journalled on the larger driving diameter 102 and a hub 104 having a third diameter in a manner similar to that previously described save that in place of the balls 38 and ring 40, the wire clip 105 (Fig. 18) which holds the fiber washer 106 in place on the rotor 103 is formed with a detent 107 on one end. This detent extends through a hole 108 in the rotor and into a groove 109 similar to that previously described. It is obvious that either type of detent (the wire clip just described, or the ball type), could be used in either configuration. A felt washer 33 may be provided similar to that in the previous embodiment, supported by a washer 110 on a shoulder 115 on the shaft 95.

The shifting is accomplished by substantially similar means in both embodiments. In the three speed drive, the cam plate 111 is mounted on a bracket 112 by means of a screw 113. A slot 114 in the cam plate is disposed about the screw 113 and is held thereon by its head. Additional support for the plate 111 is provided at the other end thereof by a channel 117 formed in the motor shaft supporting bracket 21 at the lower edge of the plate 111 and a channel 118 formed in the idler shaft supporting bracket 96 at the upper edge. Thus, it is apparent that the plate 111 is free to slide within limits defined by the extent of the slot 114. The plate in the three speed drive has two cam surfaces instead of the single slot 76.

The first cam surface is similar to that described in connection with the two speed drive and comprises a slot 120 through which extends the shifting fork 121. This fork is in all respects similar to that previously described and is fastened to a bracket 122 on the motor, by a rivet 123. The slot 120 is formed with a rising portion 124 which is effective to cause the fork 121 to shift the rotor 96 from its lower to its upper position, and a dwell portion 125 which accommodates the fork 121 while the idler wheel 47 is being shifted as described hereinafter. Dimpled portions 126 are provided to release the washer 106 from pressure of the fork 121 and to provide detent means for the cam plate.

Figure 14:
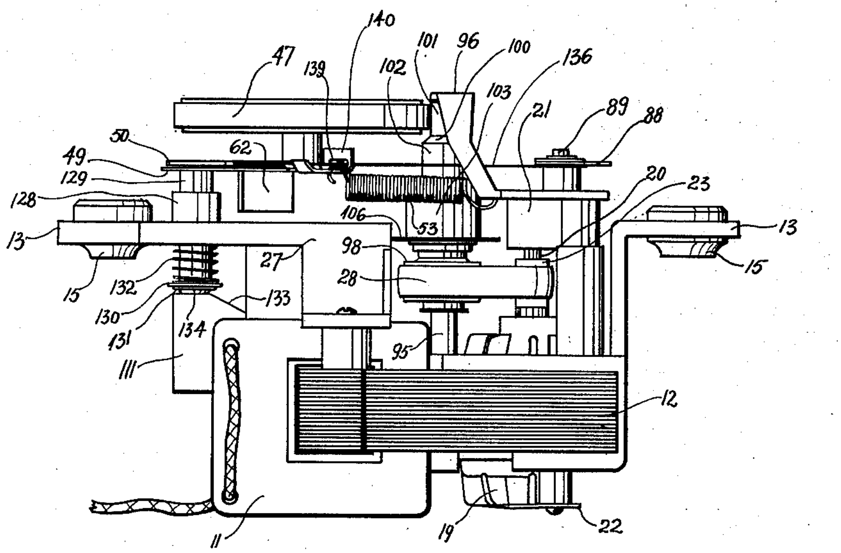
Fig. 14 is a side elevational view of my invention applied to a three-speed motor drive.
Figure 15:
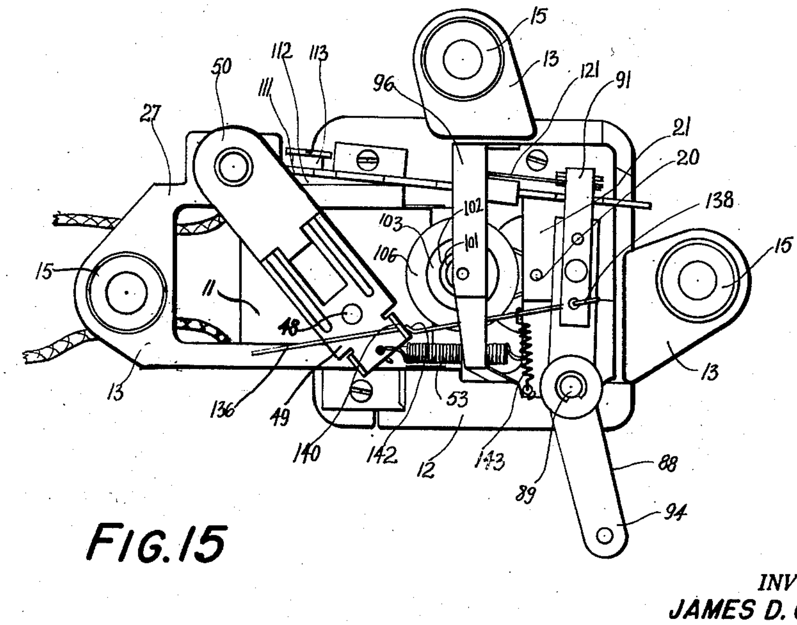
Fig. 15 is a top plan view of the three-speed drive in one shifted position with the idler wheel removed.
Figure 16:
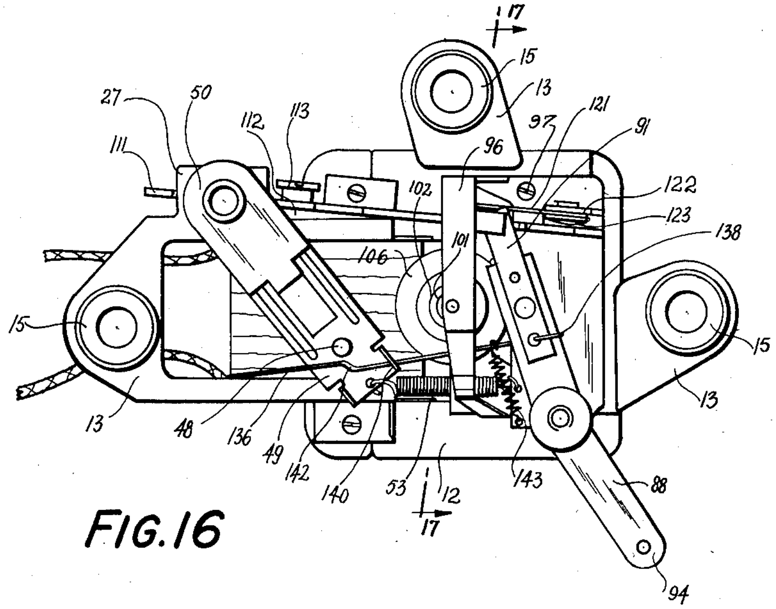
Fig. 16 is a view similar to Fig. 15 with the shifting parts in another position.
Figures 17, 18:
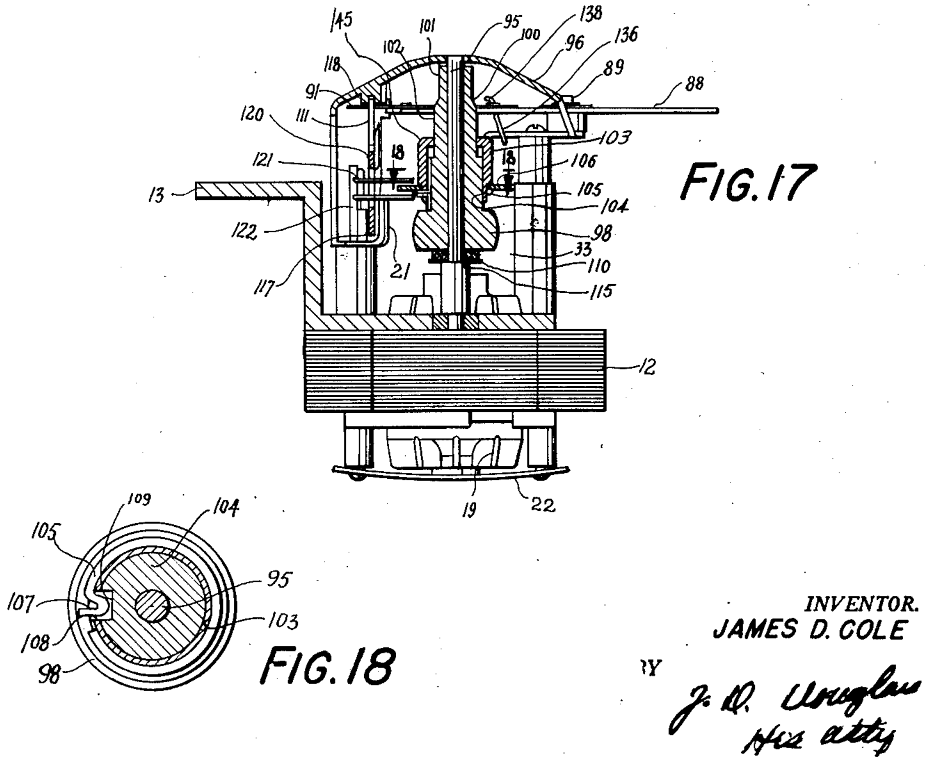
Fig. 17 is a sectional view along line 17—17 of Fig. 16.
Fig. 18 is a sectional view along line 18—18 of Fig. 17.
Figure 19:
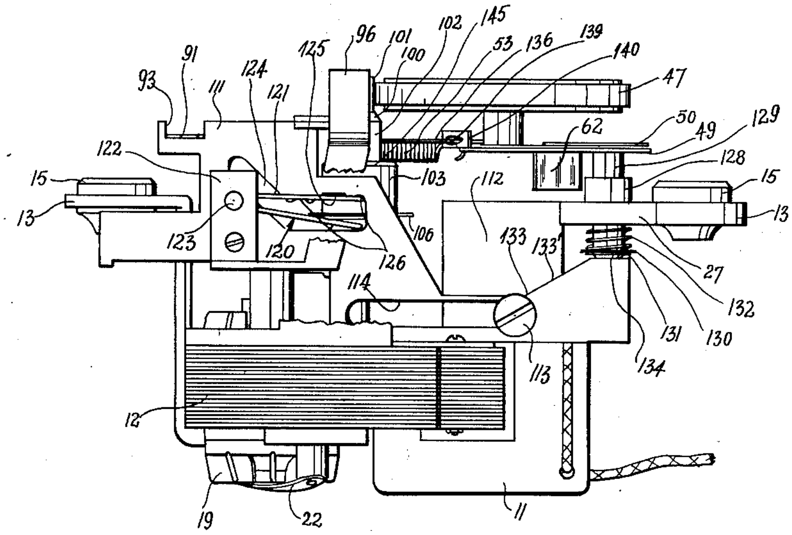
Fig. 19 is a side elevational view from the side opposite to Fig. 14 with some parts broken away to show the cam plate more clearly.
Figure 20:
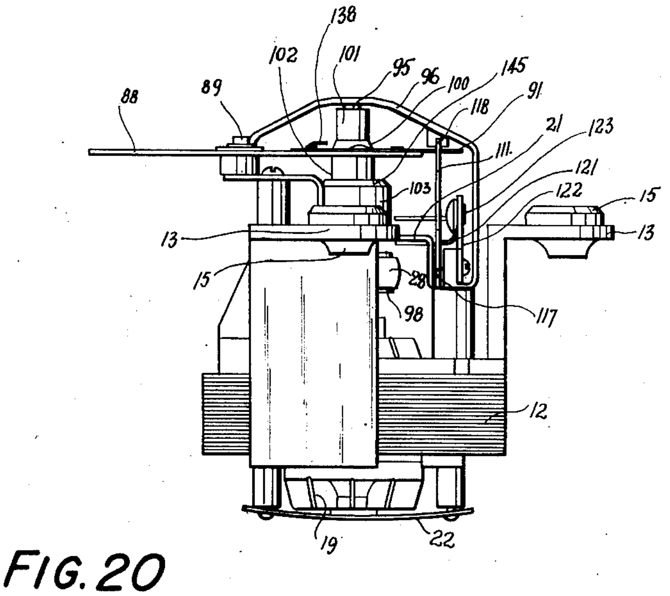
Fig. 20 is an end elevational view of the motor drive of my invention.

The second cam surface on the cam plate is effective to shift the idler wheel 47. The wheel, in order to be shiftable, is mounted somewhat differently than in previously described embodiment. The sliding arm 49 which carries the post 48 on which the idler wheel 47 is journalled, and the support arm 50 may be the same as above described. However, the support 50 instead of being merely pivoted to its bracket 27 is rotatably and slidably journalled in a bearing 128 on the bracket 27 by a sliding shaft 129 (Figs. 14 and 19). At the other end of the shaft is a washer 130 held thereon by some means, preferably a split washer 131. Between the washer 130 and the bracket 27, I provide a spring 132 which urges the shaft 129 and, therefore, the wheel 47, which is indirectly carried by the shaft, in a downward direction.

The actual shifting of the idler wheel 47 is accomplished by the action of the cam surface 133 on the follower surface 134 of the shaft 129. This cam surface 133 is formed to provide a shifting of the idler 47 while the rotor 103 is not being shifted. Thus, the rise portion 133′ of the cam surface extends over that portion of travel of the cam plate 111 where the fork 121 is in the dwell portion 125 of the cam slot 120.

The three speeds are accomplished, then, as follows: The motor and pulley 98 turn at constant speed. When the cam plate 111 is at its furthest position to the left in Fig. 19, the shifting fork 121 is at its lower position, and the idler wheel 47 is raised and, therefore, is in position to contact the smaller diameter 101 of the hub. The peripheral speed of this diameter is such that the turntable rotates at 33⅓ R. P. M. If the cam plate 111 is then shifted to its mid-position, the idler wheel is lowered by the cam surface 133 and the fork 121 is still in its lower position. The idler wheel 47 is then in position to engage the larger diameter 102 of the hub whose peripheral speed is such that the turntable rotates at 45 R. P. M. If the cam plate be then shifted one more step, the idler wheel remains in the lower position, but the shifting fork 121 raises the rotor 103 into position to be engaged by the idler wheel 47 and the turntable will then be driven at 78.26 R. P. M. The shifting lever 88 pivoted on the post 89 is substantially similar to that previously described and its operation is exactly similar.

It is not necessary, in this embodiment to disengage the wheel 47 from the smaller diameter 101 of the hub in shifting from 33⅓ to 45 R. P. M., since in the shifting process, the wheel rolls up the broad chamfer 100 as the motor runs, and if the shifting is done with the motor stopped, the spring 132 urges the idler 47 downward into proper engagement soon after the motor is started. However, in shifting from the larger diameter 102 of the hub to the rotor 103, i. e., from 45 R. P. M. to 78 R. P. M., it is necessary to move the idler 47 away so that the rotor 103 may be moved upward to the proper place. This may be accomplished by the same means as was used in the two speed motor previously described, but I have shown an alternative means in Figs. 15, 16 and 19.

This disengaging means comprises a stiff wire 136 which is pivotally fixed to the shifting lever 88 preferably merely by extending through a hole in the lever and being bent over at 138 to prevent the wire from coming loose. At the other end the wire 136 extends through a slotted hole 139 in an ear 140 struck upwardly from the sliding arm 49. Near this end the wire is bent in a step formation at 142 which is adaped to engage the ear 140 when the shifting lever 88 is moved from the 45 R. P. M. position. In order to ensure the proper engagement, a light spring 143 urges the wire 136 in the direction so that the stepped formation 142 will engage the ear 140. This engagement designedly takes place just as the shifting lever 88 is moved past the 45 R. P. M. position and continues until the lever is in the 78 R. P. M. position. At this point, however, the motion has been such that the idler wheel 47 does not quite completely clear the rotor 103 as it is moving upward. Therefore, a chamfer 145 is provided on the rotor 103, up which the idler 47 rolls to complete the shifting and to disengage the wire 136 from the ear so that there will be proper frictional engagement between the idler 47 and the rotor 103 and turntable 17 to drive the turntable.

It is conceived that a fourth different speed might be provided by a shiftable rotor on the smaller diameter 101 of the hub adapted to shift upward out of contact with the idler. However, since thus far there are only three common recording speeds, the fourth speed is not necessary nor even desirable.

It is thus apparent that I have provided a motor drive for a phonograph turntable capable of driving the turntable at any of several rotative speeds merely by a shifting of a lever.

Having thus described my invention, I am aware that numerous and extensive departures may be made therefrom without departing from the spirit or scope of my invention.

I claim:

1. A multi-speed drive for a phonograph turntable comprising a motor, idler pulley means in driven relationship with said motor, shiftable means on said pulley means adapted to be shifted axially thereon, and an idler wheel in frictional engagement with said turntable and either said pulley means or said shiftable means depending on the position of said shiftable means, said idler wheel being thereby adapted to drive said turntable at a plurality of speeds.

2. A multi-speed drive for a phonograph turntable comprising a motor, idler pulley means in driven relationship with said motor, shiftable means on said pulley means adapted to be shifted axially thereon, and an idler wheel in frictional engagement with said turntable and either said pulley means or said shiftable means depending on the position of said shiftable means, said idler wheel being thereby adapted to drive said turntable at a plurality of speeds, a disk on said shiftable means extending beyond the periphery thereof, fork means embracing said disk and cam means adapted to cause said fork means to shift said shiftable means.

3. A multi-speed drive for a phonograph turntable comprising a motor, idler pulley means in driven relationship with said motor, shiftable means on said pulley means adapted to be shifted axially thereon, and an idler wheel in frictional engagement with said turntable and either said pulley means or said shiftable means depending on the position of said shiftable means, said idler wheel being thereby adapted to drive said turntable at a plurality of speeds, a disk on said shiftable means extending beyond the periphery thereof, fork means embracing said disk and cam means adapted to cause said fork means to shift said shiftable means, said cam means comprising a plate slidably mounted on said motor and formed with a cam slot therein through which said fork means extends.

4. A multi-speed drive for a phonograph turntable comprising a motor, idler pulley means in driven relationship with said motor, shiftable means on said pulley means adapted to be shifted axially thereon, and an idler wheel in frictional engagement with said turntable and either said pulley means or said shiftable means depending on the position of said shiftable means, said idler wheel being thereby adapted to drive said turntable at a plurality of speeds, a disk on said shiftable means extending beyond the periphery thereof, fork means embracing said disk and cam means adapted to cause said fork means to shift said shiftable means, said cam means comprising a plate slidably mounted on said motor and formed with a cam slot therein through which said fork means extends, and means on said plate adapted to disengage said idler wheel from said frictional engagement while said shiftable means is being shifted into position to be engaged thereby.

5. A multi-speed drive for a phonograph turntable comprising a motor, idler pulley means in driven relationship with said motor, shiftable means on said pulley means adapted to be shifted axially thereon, and an idler wheel in frictional engagement with said turntable and either said pulley means or said shiftable means depending on the position of said shiftable means, said idler wheel being thereby adapted to drive said turntable at a plurality of speeds, a disk on said shiftable means extending beyond the periphery thereof, fork means embracing said disk, and cam means adapted to cause said fork means to shift said shiftable means, said cam means comprising a plate slidably mounted on said motor and formed with a cam slot therein through which said fork means extends, and lever means pivoted on said motor adapted to shift said plate.

6. A multi-speed drive for a phonograph turntable comprising a motor, idler pulley means in driven relationship with said motor, shiftable means on said pulley means adapted to be shifted axially thereon, an idler wheel in frictional engagement with said turntable adapted to be driven by either said shiftable means or said pulley means dependent on the position of said shiftable means, said idler wheel being pivoted on a shiftable mount on said motor and adapted to be shifted to engage either of a plurality of diameters on said pulley means.

7. A multi-speed drive for a phonograph turntable comprising a motor, idler pulley means in driven relationship with said motor, shiftable means on said pulley means adapted to be shifted axially thereon, an idler wheel in frictional engagement with said turntable adapted to be driven by either said shiftable means or said pulley means dependent on the position of said shiftable means, said idler wheel being pivoted on a shiftable mount on said motor and adapted to be shifted to engage either of a plurality of diameters on said pulley means, and means adapted to shift said shiftable means and said idler wheel mounting.

8. A multi-speed drive for a phonograph turntable comprising a motor, idler pulley means in driven relationship with said motor, shiftable means on said pulley means adapted to be shifted axially thereon, an idler wheel in frictional engagement with said turntable adapted to be driven by either said shiftable means or said pulley means dependent on the position of said shiftable means, said idler wheel being pivoted on a shiftable mount on said motor and adapted to be shifted to engage either of a plurality of diameters on said pulley means, a disk on said shiftable means extending beyond the periphery thereof, fork means embracing said disk, and cam means engaging said fork to cause it to shift said shiftable means.

9. A multi-speed drive for a phonograph turntable comprising a motor, idler pulley means in driven relationship with said motor, shiftable means on said pulley means adapted to be shifted axially thereon, an idler wheel in frictional engagement with said turntable adapted to be driven by either said shiftable means or said pulley means dependent on the position of said shiftable means, said idler wheel being pivoted on a shiftable mount on said motor and adapted to be shifted to engage either of a plurality of diameters on said pulley means, a cam plate slidably mounted on said motor formed with cam surfaces adapted to engage said shiftable mount to shift said idler wheel.

10. A multi-speed drive for a phonograph turntable comprising a motor, idler pulley means in driven relationship with said motor, shiftable means on said pulley means adapted to be shifted axially thereon, an idler wheel in frictional engagement with said turntable adapted to be driven by either said shiftable means or said pulley means dependent on the position of said shiftable means, said idler wheel being pivoted on a shiftable mount on said motor and adapted to be shifted to engage either of a plurality of diameters on said pulley means, a disk on said shiftable means extending beyond the periphery thereof, fork means embracing said disk, and cam means engaging said fork to cause it to shift said shiftable means, comprising a cam plate slidably mounted on said motor formed with a cam slot therein through which said fork extends.

11. A multi-speed drive for a phonograph turntable comprising a motor, idler pulley means in driven relationship with said motor, shiftable means on said pulley means adapted to be shifted axially thereon, an idler wheel in frictional engagement with said turntable adapted to be driven by either said shiftable means or said pulley means dependent on the position of said shiftable means, said idler wheel being pivoted on a shiftable mount on said motor and adapted to be shifted to engage either of a plurality of diameters on said pulley means, a disk on said shiftable means extending beyond the periphery thereof, fork means embracing said disk, and cam means engaging said fork to cause it to shift said shiftable means, comprising a cam plate slidably mounted on said motor formed with a cam slot therein through which said fork extends, said plate also having cam surfaces adapted to engage said shiftable mount to shift said idler wheel.

12. A multi-speed drive for a phonograph turntable comprising a motor having a driving pulley, an idler shaft mounted on said motor, an idler pulley on said shaft, belt means between said driving pulley and said idler pulley to drive said idler pulley, a hub in extension from said idler pulley, a rotor adapted to rotate with said hub and shiftable longitudinally thereof, said hub in extension beyond said rotor, an idler wheel adapted to engage said hub or said rotor dependent on the shifted position of said rotor, and said turntable frictionally to drive said turntable.

13. A multispeed drive for a phonograph turntable comprising a motor having a driving pulley, an idler shaft mounted on said motor, an idler pulley on said shaft, belt means between said driving pulley and said idler pulley to drive said idler pulley, a hub in extension from said idler pulley, a rotor adapted to rotate with said hub and shiftable longitudinally thereof, said hub normally extending beyond said rotor, an idler wheel adapted to engage said hub or said rotor dependent on the shifted position of said rotor, and said turntable frictionally to drive said turntable, and means mounted on said motor to shift said rotor into and out of engagement with said wheel.

14. A multispeed drive for a phonograph turntable comprising a motor, idler means mounted on said motor adapted to be driven thereby, said idler means being formed with a plurality of diameters, an idler wheel shiftably mounted on said motor adapted to be shifted to engage any of said plurality of diameters and said turntable to drive said turntable at a plurality of rotative speeds.

15. The combination with a continuously driven pulley and a mobile idler wheel adapted to be drivingly associated with the depending flange of a conventional phonograph turntable, of mechanism for selectively driving the turntable at one of a plurality of speeds from the pulley, said mechanism comprising a plurality of driver elements in driving communication with said pulley, one of the elements being in coaxial relationship to the other element, a pivoted fork element, cam means in association with said elements, means in connection with said cam means to selectively move said cam means to one of a plurality of predetermined positions, said cam means being adapted to swing said pivoted fork element as said cam means is moved, annular disk means in connection with one of said driver elements, said disk means being cooperatively associated with said pivoted element by which said driver element is adapted to be moved to a plurality of predetermined positions with respect to the other of the driver elements, and resilient means coupled to the mobile idler wheel to drivingly associate said wheel with said last named driver element when it is in one of its predetermined positions and when it is in another of its predetermined positions providing for driving engagement of the other of said driver elements with said wheel, said resilient means also providing for concurrent driving communication between said wheel and said turntable when drivingly associated with either of said driver elements.

16. The combination with a continuously driven pulley and a mobile idler wheel adapted to be drivingly associated with the depending flange of a conventional phonograph turntable, of mechanism for selectively driving the turntable at one of a plurality of speeds from the pulley, said mechanism comprising first and second driver elements in driving communication with said pulley, said driver elements being in coaxial relationship with each other, a pivoted fork element, a pair of fingers extending toward said driver elements from said fork element, a longitudinally slidable member in association with said elements, manual lever means to move said member selectively to one of a plurality of predetermined positions, cam surfaces on said longitudinally slidable member adapted to swing said fork element as said slidable member is moved, an annular disk member on the second driver element, said disk member extending between said fingers to provide a plurality of positions for said second driver element with respect to the first of the driver elements, means coupled to the mobile idler wheel to associate said wheel drivingly with said second driver element when it is in one of its predetermined positions and, when it is in another of its predetermined positions, providing for driving engagement of the first of said driver elements with said wheel, said resilient means also providing for concurrent driving communication between said wheel and said turntable when drivingly associated with either of said driver elements, and means in connection with said longitudinally movable member to move said wheel out of engagement with one of said driver elements as said longitudinally movable member is moved to provide for shifting of said second element with respect to said first driver element.

17. The combination with a constant speed motor having a motor pulley in connection therewith and bracket portions thereon, one of which being for support of a mobile idler wheel adapted to be drivingly associated with the depending peripheral flange of a conventional phonograph turntable, of mechanism for selectively driving the turntable at one of a plurality of speeds from the motor pulley, said mechanism comprising an idler pulley adapted to rotate about an axis in fixed relationship to one of said bracket portions, means to drivingly couple said idler pulley to said motor pulley, a first driver element in driving communication with said idler pulley, a second driver element in driving communication with said first driver element, an annular disk portion on said second driver element, a bifurcated element having a pair of finger portions at one end thereof adapted to straddle said disk portion, pivot means to anchor said bifurcated element pivotally at the other end thereof to one of the bracket portions, cam means slidably anchored by said pivot means, manual lever means coupled to said cam means by which said cam means is adapted to be moved to selectively shift said second driver element between a plurality of predetermined positions, means to provide concurrent driving relationship between said mobile idler wheel and said turntable and said second driver element when in one position and between said mobile idler wheel and said first driver element when said second driver element is in its other position, and means in connection with said cam means adapted to remove said mobile idler wheel from engagement with either of said driver elements while said second driver element is being moved from one to another of its positions.

18. In a phonograph record player of the class in which a constant speed motor having a motor pulley and bracket portions in connection therewith, one of the portions being for support of a mobile idler wheel adapted to drive a conventional phonograph turntable through its depending peripheral flange, the idler wheel being supported at one end of one of a pair of carrier members one of which is slidably anchored to a pivot for the other of the members, which other member includes a guide portion, in combination, mechanism for selectively driving the mobile idler at a plurality of speeds from the motor pulley, said mechanism comprising an idler pulley adapted to rotate about an axis in fixed relationship to a second of the bracket portions, means to couple said second idler drivingly to the motor pulley, a first driver element on said idler pulley and in axial extension therefrom, means in coupled relationship to said idler wheel to bias said wheel into driving relationship with said first driver element thereby providing one speed for said idler wheel, a second driver element slidably keyed to said first driver element, means including a longitudinally movable cam plate beside said driver element by which said second driver element is drivingly engaged by said idler wheel to provide another speed therefor, said cam plate having a slot at either end thereof, means including a headed pin on one of said bracket portions in extension through one of said slots, a support plate fastened to another of said bracket portions and in engagement with the other of the slots, said pin and said support plate being adapted to confine said cam plate against displacement thereof in a direction parallel to the axis of said first and second driver elements but providing for movement of the cam plate transversely of said axis, said cam plate also having a cam slot extending obliquely and centrally thereof, spaced apart cam surfaces provided by said cam slot, a bifurcated element adapted to swing about said headed pin, said bifurcated element including a pair of resilient arms, a pair of fingers at the free ends of said arms and in extension through said cam slot toward said driver elements, said fingers being resiliently deflected toward each other by said cam surfaces, manual lever means including a resilient arm adapted to be pressed into engagement with said cam plate by which said cam plate is adapted to be moved to move said fingers substantially transversely of said cam plate, a flange peripherally of said second driver element, said flange extending between the fingers, and an extension on said cam plate adapted to engage the guide portion of one of said carrier plates to remove the idler wheel from driving engagement with one of said driver elements while the second of the driver elements is being shifted.

19. A multi-speed drive for a phonograph turntable comprising a frame; a motor mounted on said frame; idler pulley means in driven relationship to said motor comprising a driven pulley having an elongated hub, said hub being formed with two driving portions of different diameters axially spaced apart, shiftable driving means adapted to be driven by said hub and shiftable axially between two positions thereon; sliding arm means shiftingly mounted on said frame, an idler wheel journalled on said arm means adapted to be driven by said idler pulley means and engaging said turntable to drive it; and means to shift said shiftable driving means and said arm means comprising a cam plate slidably mounted in said frame and having two cam surfaces, the first of said cam surfaces engaging said arm means to shift said idler wheel from engagement with one of said driving portions to the second driving portion, a flange carried by said shiftable driving means, fork means pivotally mounted on said frame straddling said flange, the second of said cam surfaces adapted to move said fork to cause said shiftable driving means to be shifted between its two positions.

20. A multi-speed drive for a phonograph turntable comprising a frame; a motor mounted on said frame; idler pulley means in driven relationship to said motor comprising a driven pulley pulley having an elongated hub, said hub being formed with two driving portions of different diameters axially spaced apart, shiftable driving means adapted to be driven by said hub and shiftable axially between two positions thereon; sliding arm means shiftingly mounted on said frame; an idler wheel journalled on said arm means adapted to be driven by said idler pulley means and engaging said turntable to drive it; and means to shift said shiftable driving means and said arm means comprising a cam plate slidably mounted in said frame and having two cam surfaces, the first of said cam surfaces engaging said arm means to shift said idler wheel from engagement with one of said driving portions to the second driving portion, a flange carried by said shiftable driving means, fork means pivotally mounted on said frame straddling said flange, the second of said cam surfaces adapted to move said fork to cause said shiftable driving means to be shifted between its two positions, said cam surfaces being arranged so that said shiftable driving means is shifted while said idler wheel is at a dwell portion of said first cam and that said idler wheel is shifted while said fork means is at a dwell portion of said second cam.

21. A multi-speed drive for a phonograph turntable comprising a frame; a motor mounted on said frame; idler pulley means in driven relationship to said motor comprising a driven pulley having an elongated hub, said hub being formed with two driving portions of different diameters axially spaced apart, shiftable driving means adapted to be driven by said hub and shiftable axially between two positions thereon; sliding arm means shiftingly mounted on said frame; an idler wheel journalled on said arm means adapted to be driven by said idler pulley means and engaging said turntable to drive it; and means to shift said shiftable driving means and said arm means comprising a cam plate slidably mounted in said frame and having two cam surfaces, the first of said cam surfaces engaging said arm means to shift said idler wheel from engagement with one of said driving portions to the second driving portion, a flange carried by said shiftable driving means, fork means pivotally mounted on said frame straddling said flange, the second of said cam surfaces adapted to move said fork to cause said shiftable driving means to be shifted between its two positions, lever means pivotally mounted on said frame and engaging said cam plate to move it; and disengagement means pivoted to said lever means and formed with a step adapted to engage said sliding arm means to disengage said idler wheel from said idler pulley means while said shiftable driving means is shifted.

JAMES D. COLE.

REFERENCES CITED

The following references are of record in the file of this patent:

UNITED STATES PATENTS

| Number | Name | Date |
|---|---|---|
| 904,723 | Reeves | Nov. 24, 1908 |
| 1,070,890 | Heylman | Aug. 19, 1913 |
| 1,320,519 | Ahearn | Nov. 4, 1919 |
| 2,381,079 | Pittman | Aug. 7, 1945 |
| 2,478,538 | Leitner | Aug. 9, 1949 |